(12) United States Patent
Isono et al.

(10) Patent No.: US 10,203,029 B2
(45) Date of Patent: *Feb. 12, 2019

(54) MOTOR DRIVE UNIT

(71) Applicants: TOYOTA JIDOSHA KABUSHIKI KAISHA, Toyota-shi, Aichi-ken (JP); ALCHEMICA CORPORATION, Susono-shi, Shizuoka (JP)

(72) Inventors: Hiroshi Isono, Susono (JP); Aizoh Kubo, Kyoto (JP)

(73) Assignees: TOYOTA JIDOSHA KABUSHIKI KAISHA, Toyota (JP); ALCHEMICA CORPORATION, Susono (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/437,493

(22) Filed: Feb. 21, 2017

(65) Prior Publication Data

US 2017/0241533 A1 Aug. 24, 2017

(30) Foreign Application Priority Data

Feb. 18, 2016 (JP) ................................. 2016-029050

(51) Int. Cl.
*F16H 48/10* (2012.01)
*F16H 48/36* (2012.01)

(52) U.S. Cl.
CPC ............. *F16H 48/36* (2013.01); *F16H 48/10* (2013.01); *F16H 2048/104* (2013.01); *F16H 2048/106* (2013.01); *F16H 2048/364* (2013.01)

(58) Field of Classification Search
CPC .... F16H 48/36; F16H 48/10; F16H 2048/106; F16H 2048/104; F16H 2048/364
(Continued)

(56) References Cited

U.S. PATENT DOCUMENTS 8,672,790 B2 3/2014 Severinsson et al.
2002/0162409 A1 11/2002 Ito et al.
(Continued)

FOREIGN PATENT DOCUMENTS

EP 1 238 890 A1 9/2002
FR 2627832 A1 * 9/1989 ............. B60K 23/04
(Continued)

OTHER PUBLICATIONS

Oct. 4, 2017 Office Action issued in U.S. Appl. No. 15/428,468.
May 3, 2018 U.S. Office Action Issued in U.S. Appl. No. 15/428,468.

*Primary Examiner* — Roger L Pang
(74) *Attorney, Agent, or Firm* — Oliff PLC (57) ABSTRACT

A motor drive unit having an electromagnetic brake serving as an inboard brake that may also be used as a parking brake is provided. In the motor drive unit, output torque of a drive motor is distributed to a first driveshaft and a second driveshaft. The motor drive unit comprises: an electromagnetic brake device that stops rotation of an output shaft by contacting a brake stator to a brake rotor; a brake motor that generates torque when energized; and an engagement force generating device that generates an engagement force to engage the brake member with the rotary member when the output torque of the brake motor is applied thereto, and that maintains the engagement between the brake member and the rotary member when current supply to the electromagnetic brake device and the brake motor is stopped.

6 Claims, 6 Drawing Sheets

(58) Field of Classification Search
USPC .................................. 475/150, 151, 154, 221
See application file for complete search history.

(56) References Cited

U.S. PATENT DOCUMENTS

| | | |
|---|---|---|
| 2015/0232070 A1 | 8/2015 | Sten |
| 2016/0153537 A1 | 6/2016 | Kubo et al. |
| 2017/0227104 A1 | 8/2017 | Isono et al. |
| 2017/0241532 A1 | 8/2017 | Isono et al. |
| 2017/0328461 A1* | 11/2017 | Nasu .................. F16H 48/10 |
| 2018/0072280 A1* | 3/2018 | Heindl .................. B60T 1/062 |

FOREIGN PATENT DOCUMENTS

| | | |
|---|---|---|
| JP | 2002310265 A | 10/2002 |
| JP | 2012519812 A | 8/2012 |
| WO | 2010/101506 A1 | 9/2010 |
| WO | 2015/008661 A1 | 1/2015 |

\* cited by examiner

MOTOR DRIVE UNIT

CROSS REFERENCE TO RELATED APPLICATION

The present invention claims the benefit of Japanese Patent Application No. 2016-029050 filed on Feb. 18, 2016 with the Japanese Patent Office, the disclosures of which are incorporated herein by reference in its entirety.

BACKGROUND

Field of the Invention

Embodiments of the present application relate to the art of a drive motor used as a prime mover of automobiles, and especially to a motor drive unit having a power transmission device between the drive motor and drive wheels.

Discussion of the Related Art

PCT international publication WO 2015/008661 describes one example of a motor drive unit of this kind. The drive gear unit taught by WO 2015/008661 as a torque vectoring device comprises a differential unit for distributing torque delivered from a drive motor to right and left drive wheels, and a differential motor for controlling a torque split ratio to the drive wheels. The differential unit comprises a pair of single-pinion planetary gear units, and sun gears of the planetary gear units are connected to both ends of a rotary shaft. An input gear is fitted onto an intermediate portion of the rotary shaft, and torque of the drive motor is applied to the input gear. Ring gears of the planetary gear units are connected to each other through a torque reversing device so that the ring gears are rotated in opposite directions. The differential motor is connected to one of the ring gears, and drive wheels are connected the carriers of the planetary gear units.

A driving performance of an electric vehicle may be improved by using the torque vectoring device taught by WO 2015/008661 as a motor drive unit. The motor drive unit of this kind may serve as an inboard brake by incorporating a brake device into the motor drive unit to apply brake torque to the drive wheels. To this end, for example, an electromagnetic brake may be used in the motor drive unit. In this case, a hydraulic system and reinforcements such as a brake caliper and so on may be omitted, and hence the motor drive unit may be downsized and lightened. In addition, an unsprung load of the vehicle may be reduced.

In order to selectively apply a braking torque to the vehicle, an electromagnetic brake adapted to generate a braking torque by energizing an electromagnetic coil is suitable for the use as the inboard brake. However, the electromagnetic brake cannot maintain a braking torque to stop a motion of a vehicle during parking while turning the power off.

Alternatively, an electromagnetic brake adapted to generate a braking torque utilizing elastic force of a spring may also be used as the inboard brake. In this case, a braking torque may be applied to the vehicle even when a coil of the electromagnetic brake is unenergized. In this case, however, the braking torque is applied to the vehicle immediately even if a current supply to the coil is stopped by some sort of failure during propulsion and consequently the vehicle is decelerated abruptly. Thus, the electromagnetic brake of this kind is unsuitable to be used as the inboard brake in the motor drive unit of automobiles.

SUMMARY

Aspects of embodiments of the present application have been conceived noting the foregoing technical problems, and it is therefore an object of embodiments of the present application is to provide a motor drive unit having an electromagnetic brake serving as an inboard brake, that may also be used as a parking brake.

The present application relates to a motor drive unit, comprising: a drive motor; a first planetary gear unit having a first sun gear, a first ring gear and a first carrier; a second planetary gear unit having a second sun gear, a first second gear and a second carrier; a connection shaft connecting the first sun gear and the second sun gear; a transmission mechanism that transmits torque between an output shaft of the drive motor and the connection shaft; a torque reversing mechanism that transmits torque between the first ring gear and the second ring gear while reversing direction of the torque; and a first driveshaft connected to the first carrier and a second driveshaft connected to the second carrier to which output torque of the drive motor is distributed. In order to achieve the above-explained objective, according to the preferred embodiment of the present application, the motor drive unit is provided with: an electromagnetic brake device that stops rotation of the output shaft by contacting at least one brake member that is allowed to rotate but a rotational angle thereof is restricted to a rotary member rotated integrally with the output shaft and relatively to the brake member, when energized to establish a magnetic force; a brake motor that generates torque when energized; and an engagement force generating device that generates an engagement force to bring the brake member into frictional engagement with the rotary member when the output torque of the brake motor is applied thereto, and that maintains the frictional engagement between the brake member and the rotary member to keep stopping the rotation of the output shaft when current supply to the electromagnetic brake device and the brake motor is stopped.

In a non-limiting embodiment, the engagement force generating device may include a feed screw mechanism that generates an axial force to frictionally engage the brake member with the rotary member by applying the output torque of the drive motor in a predetermined direction.

In a non-limiting embodiment, the brake member may be meshed with outer teeth formed on an outer circumferential face of at least any one of the first ring gear and the second ring gear to be rotated.

In a non-limiting embodiment, the motor drive unit may further comprise a differential motor that applies torque to any one of the first ring gear and the second ring gear.

Thus, according to the embodiment of the present application, the drive motor serving as a prime mover of the vehicle and the differential unit for distributing torque of the drive motor may be arranged in the motor drive unit. As described, the motor drive unit further comprises the electromagnetic brake device. According to the embodiment of the present application, therefore, the electromagnetic brake device may serve as an inboard brake of the vehicle. As also described, the motor drive unit further comprises the engagement force generating device and the brake motor for actuating the engagement force generating device. According to the embodiment of the present application, therefore, rotation of the output shaft may be stopped even if current supply to the electromagnetic motor and the brake motor is stopped while halting the output shaft by actuating the engagement force generating device by the brake motor. That is, braking force can be maintained certainly in a parking vehicle even if a power source is turned off.

As described, according to the embodiment of the present application, the feed screw mechanism that translates output torque of the drive motor to the axial force to engage the brake member with the rotary member is used as the engagement force generating device. Specifically, reversed efficiency of the feed screw mechanism to translate linear motion to rotational motion is adjusted to be lower than forward efficiency to translate rotational motion to linear motion. For this reason, the axial force stopping the rotation of the output shaft can be maintained certainly. According to the embodiment of the present application, therefore, the output shaft may be kept stopping even if current supply to the electromagnetic motor and the brake motor is stopped while halting the output shaft by actuating the engagement force generating device by the brake motor.

As also described, according to the embodiment of the present application, the brake member of the electromagnetic brake is meshed with the ring gear of any one of the first planetary gear unit and the second planetary gear unit. In addition, the first ring gear is connected to the second ring gear through the through the torque reversing mechanism, and the brake member is brought into contact to the rotary member to halt the output shaft by activating the electromagnetic brake. That is, rotation of the brake member is also stopped when stopping the rotation of the rotary member, and the braking force is maintained by the parking brake device. Consequently, rotations of the first ring gear and the second ring gear are stopped. According to the embodiment of the present application, therefore, the output shaft of the drive motor can be halted by the parking brake device, and differential rotation between the first driveshaft and the second driveshaft can be restricted.

Further, according to the embodiment of the present application, the motor drive unit is further provided with the differential motor for applying torque to any one of the first ring gear and the second ring gear. According to the embodiment of the present application, therefore, a torque split ratio to the first driveshaft and the second driveshaft can be controlled by controlling the output torque and the rotational speed of the differential motor. That is, the motor drive unit may serve as a torque vectoring device.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
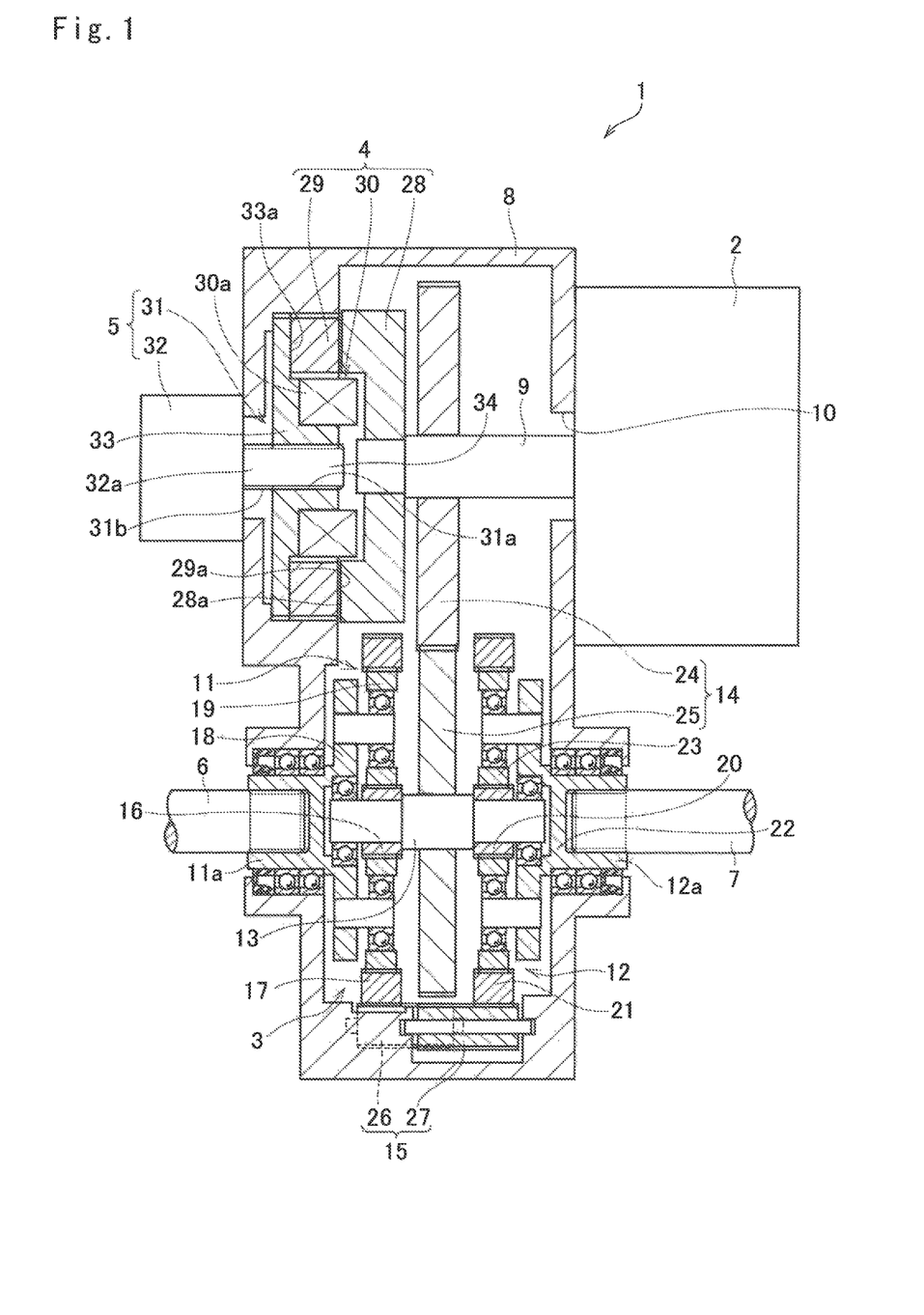
FIG. 1 is a cross-sectional view showing a preferred embodiment of the motor drive unit according to the present application.

Preferred embodiments of the present application will now be explained with reference to the accompanying drawings. Referring now to FIG. 1, there is shown a preferred embodiment of the motor drive unit according to the present application. The motor drive unit shown in FIG. 1 comprises a drive motor 2, a differential unit 3, an electromagnetic brake device 4, a parking brake device 5, a first driveshaft 6 and a second driveshaft 7.

The drive motor 2 is intended to be used as a prime mover of a vehicle, and for example, a permanent magnet synchronous motor, and an induction motor may be used as the drive motor 2. The drive motor 2 is fixed to a casing 8, and an output shaft 9 of the drive motor 2 that is rotated integrally with a rotor (not shown) is inserted into the casing 8 through an insertion hole 10 so that an output torque of the drive motor 2 is delivered to the differential unit 3 through the output shaft 9.

According to the example shown in FIG. 1, the differential unit 3 comprises a first planetary gear unit 11, a second planetary gear unit 12, a connection shaft 13 connecting the first planetary gear unit 11 and the second planetary gear unit 12, a transmission mechanism 14 transmitting torque between the drive motor 2 and the connection shaft 13, and a torque reversing mechanism 15 transmitting torque between the first planetary gear unit 11 and the second planetary gear unit 12 while reversing direction of the torque. Here, structures of the first planetary gear unit 11 and the second planetary gear unit 12 are identical to each other.

The first planetary gear unit 11 is a single-pinion planetary gear unit comprises a first sun gear 16, a first ring gear 17 as an internal gear arranged concentrically with the first sun gear 16, a plurality of pinion gears 19 interposed between the first sun gear 16 and the first ring gear 17 while meshing with those gears, and a first carrier 18 supporting the pinion gears 19 in a rotatable manner. As described later, an output torque of the drive motor 2 is applied to the first sun gear 16 through the transmission mechanism 14 and the connection shaft 13. The first ring gear 17 is connected to a second ring gear 21 of the second planetary gear unit 12, and the first carrier 18 is connected to the first driveshaft 6. On an outer circumference of the first ring gear 17, outer teeth are also formed to be meshed with a first pinion 26 of the torque reversing mechanism 15.

The second planetary gear unit 12 is also a single-pinion planetary gear unit comprises a second sun gear 20, a second ring gear 21 as an internal gear arranged concentrically with the second sun gear 20, a plurality of pinion gears 23 interposed between the second sun gear 20 and the second ring gear 21 while meshing with those gears, and a second carrier 22 supporting the pinion gears 23 in a rotatable manner. As described later, an output torque of the drive motor 2 is also applied to the second sun gear 20 through the transmission mechanism 14 and the connection shaft 13. The second ring gear 20 is connected to the first ring gear 17 of the first planetary gear unit 11, and the second carrier 22 is connected to the second driveshaft 7. On an outer circumference of the second ring gear 21, outer teeth are also formed to be meshed with a second pinion 27 of the torque reversing mechanism 15.

As described, structures of the first planetary gear unit 11 and the second planetary gear unit 12 are identical to each other. That is, teeth numbers and configurations of the gears, and gear ratios of the first planetary gear unit 11 and the second planetary gear unit 12 are identical to each other. Here, a double-pinion planetary gear unit may also be used as the first planetary gear unit 11 and the second planetary gear unit 12.

The connection shaft 13 extends parallel to the output shaft 9 of the drive motor 2 to connect the first sun gear 16 of the first planetary gear unit 11 to the second sun gear 20 of the second planetary gear unit 12. In the example shown in FIG. 1, specifically, the first sun gear 16 is fitted onto a left end of the connection shaft 13 to be rotated integrally therewith, and the second sun gear 20 is fitted onto a right end of the connection shaft 13 to be rotated integrally therewith. A driven gear 25 of the transmission mechanism 14 is fitted onto an intermediate portion of the connection shaft 13. The first planetary gear unit 11 is supported by the casing 8 at a first boss 11a in a rotatable manner, and the second planetary gear unit 12 is supported by the casing 8 at a second boss 12a in a rotatable manner.

The transmission mechanism 14 comprises a drive gear 24 and a driven gear 25 as an input gear to form a power transmission route between the output shaft 9 of the drive motor 2 and the differential unit 3. Specifically, the drive gear 24 is fitted onto the output shaft 9 of the drive motor 2 to be rotated integrally therewith, and the driven gear 25 is fitted onto the intermediate portion of the connection shaft 13 to be rotated integrally therewith and to be meshed with the drive gear 24.

The torque reversing mechanism 15 comprises the first pinion 26 and the second pinion 27 to transmit torque between the first ring gear 17 and the second ring gear 21 while reversing a direction. Specifically, both of the first pinion 26 and the second pinion 27 are cylindrical gears, and face widths of the first pinion 26 and the second pinion 27 are longer than those of the first ring gear 17 and the second ring gear 21. Here, teeth number of the first pinion 26 is identical to that of the second pinion 27. The first pinion 26 extends parallel to the output shaft 9 and the connection shaft 13, and supported by the casing 8 in a rotatable manner. According to the example shown in FIG. 1, a left part of the first pinion 26 is meshed with the outer teeth of the first ring gear 17, and a right part of the first pinion 26 is meshed with a left part of the second pinion 27. Likewise, a right part of the second pinion 27 is meshed with the outer teeth of the second ring gear 21, and the left part of the second pinion 27 is meshed with the right part of the first pinion 26. In the differential unit 3, a plurality of the torque reversing mechanism 15 (preferably more than three sets) are arranged around the first ring gear 17 and the second ring gear 21 at regular intervals.

For example, when the vehicle travels in a straight line, the output torque of the drive motor 2 is applied to the first sun gear 16 and the second sun gear 20, and then distributed equally to the first carrier 18 and the second carrier 22. In this situation, the torque of the first sun gear 16 is applied to the first ring gear 17 while being reversed, and the torque of the second sun gear 20 is applied to the second ring gear 21 while being reversed. That is, the torque delivered from the drive motor 2 is applied to the first ring gear 17 and the second ring gear 21 in the same direction. However, since the first ring gear 17 and the second ring gear 21 are connected through the torque reversing mechanism 15, the torque of the first ring gear 17 and the torque of the second ring gear 21 counteract to each other. In the differential unit 3, therefore, the torque delivered from the drive motor 2 is distributed equally to the first carrier 18 and the second carrier 22. That is, if the first carrier 18 and the second carrier 22 are rotated at the same speeds, the first ring gear 17 and the second ring gear 21 will not be rotated in any direction. In this situation, therefore, the first ring gear 17 and the second ring gear 21 may serve as a reaction element of each of the first planetary gear unit 11 and the second planetary gear unit 12.

Figure 2:
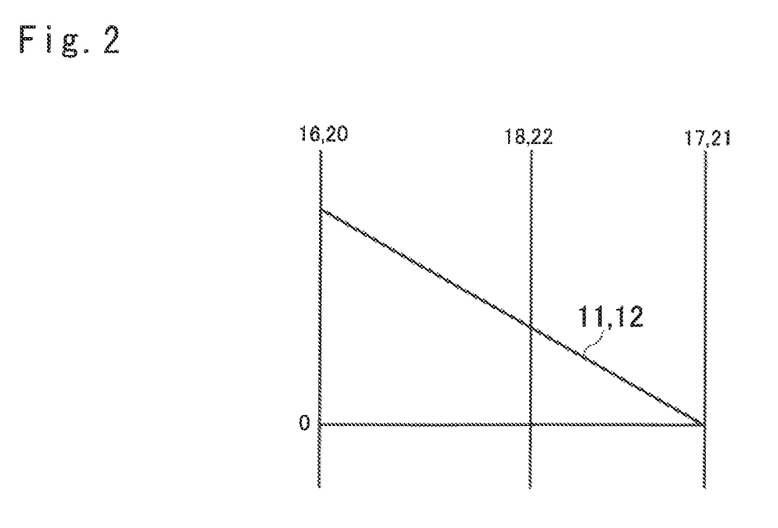
FIG. 2 is a nomographic diagram indicating rotational speeds of rotary elements of the first planetary gear unit and the second planetary gear unit in a case that the first driveshaft and the second driveshaft are rotated at a same speed.

Specifically, as indicated in FIG. 2, a rotational speed of the first sun gear 16 rotated by the torque delivered thereto is reduced in accordance with the gear ratio of the first planetary gear unit 11, and the torque is further delivered from the first carrier 18. Likewise, a rotational speed of the second sun gear 20 rotated by the torque delivered thereto is reduced in accordance with the gear ratio of the second planetary gear unit 12, and the torque is further delivered from the second carrier 22. As described, since the structures of the first planetary gear unit 11 and the second planetary gear unit 12 are identical to each other, magnitude of output torques, rotational directions, and rotational speeds of the first carrier 18 and the second carrier 22 are identical to each other. That is, the torque is distributed equally to the first carrier 18 and the second carrier 22, and the first driveshaft 6 connected to the first carrier 18 and the second driveshaft 7 connected to the second carrier 22 are rotated at the same speed.

Figure 3:
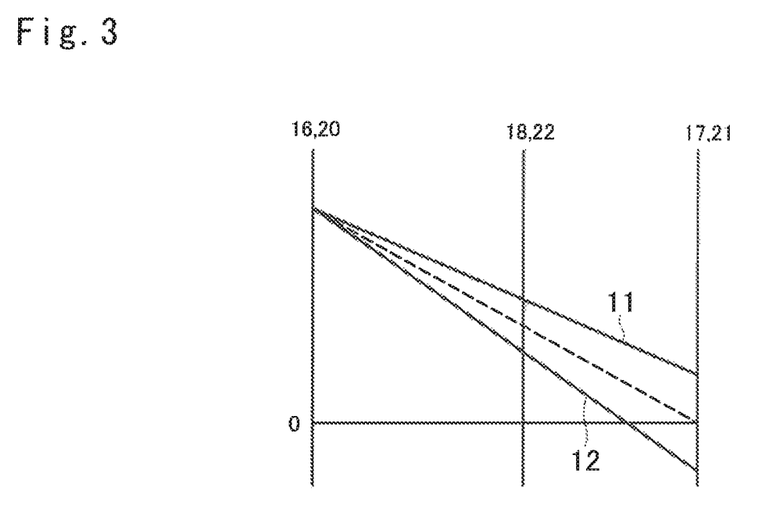
FIG. 3 is a nomographic diagram indicating rotational speeds of rotary elements of the first planetary gear unit and the second planetary gear unit in a case that the first driveshaft and the second driveshaft are rotated at different speeds.

By contrast, when the right drive wheel and the left drive wheel are rotated at different speeds e.g., during turning, the first carrier 18 and the second carrier 22 are also rotated at different speeds as indicated in FIG. 3. In this case, the torque applied to the first sun gear 16 and the second sun gear 20 is distributed to the first carrier 18 and the second carrier 22 at a predetermined ratio. In this situation, since the first ring gear 17 and the second ring gear 21 are connected to each other through the torque reversing mechanism 15, the first ring gear 17 and the second ring gear 21 are rotated at same speeds in opposite directions to serve as reaction elements. Consequently, the torque is distributed to the first carrier 18 and the second carrier 22 at a predetermined ratio governed by an absolute value of the rotational speeds of the first ring gear 17 and the second ring gear 21, and the first driveshaft 6 connected to the first carrier 18 and the second driveshaft 7 connected to the second carrier 22 are rotated at different speeds.

The differential unit 3 further comprises the electromagnetic brake device 4. The electromagnetic brake device 4 comprises a brake rotor 28, a brake stator 29, and a brake solenoid 30. When the brake solenoid 30 is energized, the brake stator 29 is brought into frictional contact to the brake rotor 28 to generate braking torque for stopping the rotation of a predetermined rotary member. That is, the electromagnetic brake device 4 will not generate braking torque unless the brake solenoid 30 is energized.

Specifically, the brake rotor 28 is a disc-shaped magnetic member, and the brake rotor 28 is also fitted onto a leading end of the output shaft 9 to be rotated integrally with the output shaft 9. A first friction face 28a is formed on an outer circumferential portion of one face of the brake rotor 28 to be opposed to a below-mentioned second friction face 29a of the brake stator 29. Accordingly, the brake rotor 28 serves as the rotary member of the motor drive unit 1.

The brake stator 29 is also an annular magnetic member, and the brake stator 29 is splined to an inner circumferential face of the casing 8. Specifically, a spline ridge (or groove) is formed on an outer circumferential face of the brake stator 29 in the axial direction to be splined to a spline groove (or ridge) formed on an inner circumferential face of a spline hole of the casing 8 in the axial direction. Thus, in the casing 8, the brake stator 29 is allowed to reciprocate in the axial direction but restricted to rotate around the output shaft 9. The above-mentioned second friction face 29a is formed on the outer circumferential portion of the face of the brake stator 29 opposed to the first friction face 28a of the brake rotor 28. Accordingly, the brake stator 29 serves as the brake member of the motor drive unit 1.

The brake solenoid 30 comprises the brake rotor 28 serving as a fixed magnetic pole, a coil 30a wound around an iron core (not shown), and the brake stator 29 serving as a movable magnetic pole. The coil 30a is attached to a pushing member 33 of the parking brake device 5 made of non-magnetic material. In the embodiment shown in FIG. 1, a predetermined clearance is maintained between an inner circumferential face of the brake stator 29 and an outer circumferential face of the coil 30a within the influence of magnetic field of the coil 30a so that the brake stator 29 is allowed to reciprocate on the coil 30a. Alternatively, the stator 29 may also be contacted to the coil 30a in a slidable manner.

When a predetermined current is applied to the coil 30a, the coil 30a establishes magnetic attraction so that the brake stator 29 is magnetically attracted toward the brake rotor 28. Consequently, the second friction face 29a of the brake stator 29 is brought into frictional contact to the first friction face 28a of the brake rotor 28 so as to stop the rotation of the output shaft 9. Optionally, although not especially illustrated in FIG. 1, a return spring may be used to isolate the second friction face 29a away from the first friction face 28a when stopping current supply to the coil 30a to allow the motor shaft 9 to rotate.

Thus, the motor drive unit 1 is provided with the electromagnetic brake device 4 to stop the rotation of the output shaft 9 of the drive motor 2. In the motor drive unit 1, rotations of the first sun gear 16 and the second sun gear 20 of the differential unit 3 can be stopped through the transmission mechanism 14 and the connection shaft 13 by thus stopping the rotation of the output shaft 9 by the electromagnetic brake device 4. Consequently, rotations of the first carrier 18 and the second carrier 22 are stopped so that rotations of the first driveshaft 6 and the second driveshaft 7 are stopped. That is, the motor drive unit 1 may also serve as an inboard brake.

As described, the motor drive unit 1 is provided with the parking brake device 5 comprising an engagement force generating device and a brake motor 32 that generates a torque when energized to actuate the engagement force generating device. In the motor drive unit 1, therefore, the brake stator 29 may be brought into frictional engagement with the brake rotor 28 to stop the rotation of the output shaft 9 even when the brake device 4 is unenergized.

Specifically, the engagement force generating device generates an engagement force to push the brake stator 29 toward the brake rotor 28 thereby bringing the brake stator 29 into frictional contact to the brake rotor 28. In addition, the engagement force generating device keeps the output shaft 9 stopping even if current supply to the brake device 4 is interrupted. For example, a feed screw mechanism that translates rotational motion to linear motion may be employed as the engagement force generating device, and the feed screw mechanism is actuated by the brake motor 32. Instead, a rack and pinion, a translation actuator, a hydraulic actuator etc. may also be used as the engagement force generating device, and those devices may also be actuated by the brake motor 32.

Specifically, the feed screw mechanism 31 generates a pushing force to push the brake stator 29 toward the brake rotor 28 by translating linear motion to rotational motion thereby bringing the brake stator 29 into frictional contact to the brake rotor 28. In addition, the feed screw mechanism 31 keeps the output shaft 9 stopping even if current supply to the brake device 4 is interrupted. To this end, the feed screw mechanism 31 is provided with the pushing member 33 and a rotary shaft 34.

The pushing member 33 is a disc-shaped non-magnetic member, and a female thread hole 31a is formed on a center of the pushing member 33 in such a manner as to penetrate through the pushing member 33 in a thickness direction. The aforementioned coil 30a of the brake solenoid 30 is fitted onto a center protrusion of the pushing member 33 while being restricted to slide thereon. A pushing face 33a on which the brake stator 29 is disposed is formed on the pushing member 33 around the coil 30a. As the brake stator 29, a spline ridge (or groove) is formed on an outer circumference of the pushing member 33. The pushing member 33 is fitted into the spline hole of the casing 8, and then the brake stator 29 is also fitted into the spline hole of the casing 8.

The rotary shaft 34 is connected to the motor shaft 32a of the brake motor 32 to be rotated integrally therewith, and the male thread 31b is also formed on an outer circumferential face of the rotary shaft 34. The male thread 31b of the rotary shaft 34 is screwed into the female thread hole 31a of the pushing member 33 to form the feed screw mechanism 31. For example, a ball screw actuator, a trapezoidal screw actuator, a square screw actuator etc. may serve as the female thread hole 31a and the male thread 31b.

Specifically, the feed screw mechanism 31 generates a thrust force (or an axial force) for pushing the pushing member 33 in the axial direction toward the brake rotor 28 by rotating the rotary shaft 34 connected to the motor shaft 32a by the brake motor 32 in a predetermined direction (i.e., in the forward direction). By contrast, the pushing member 33 is withdrawn from the brake rotor 28 by rotating the rotary shaft 34 in the opposite direction (i.e., in the reverse direction).

Thus, in the parking brake device 5, the feed screw mechanism 31 generates forward thrust force by generating forward torque by the brake motor 32, and the forward thrust force is applied to the brake stator 29. Consequently, the brake stator 29 is frictionally engaged with the brake rotor 28 to halt the output shaft 9. By contrast, the motor shaft 9 is allowed to rotate by generating a reverse torque by the brake motor 32 to withdraw the brake stator 29 from the brake rotor 28. That is, the braking force for stopping the rotation of the output shaft 9 is cancelled.

In addition, reversed efficiency of the feed screw mechanism 31 to translate linear motion to rotational motion is adjusted to be lower than forward efficiency to translate rotational motion to linear motion. That is, mechanical efficiency of the feed screw mechanism 31 is tuned in such a manner that the pushing member 33 is moved more efficiently toward the brake rotor 28 by rotating the rotary shaft 34 in the forward direction, and that the rotary shaft 34 is rotated in the reverse direction less efficiently by withdrawing the pushing member 33 from the brake rotor 28. According to the preferred example, therefore, the output shaft 9 may be halted by pushing the brake stator 29 toward the brake rotor 28 by the feed screw mechanism 31 even if the current supply to the electromagnetic brake device 4 and the brake motor 32 is stopped.

Figure 4:
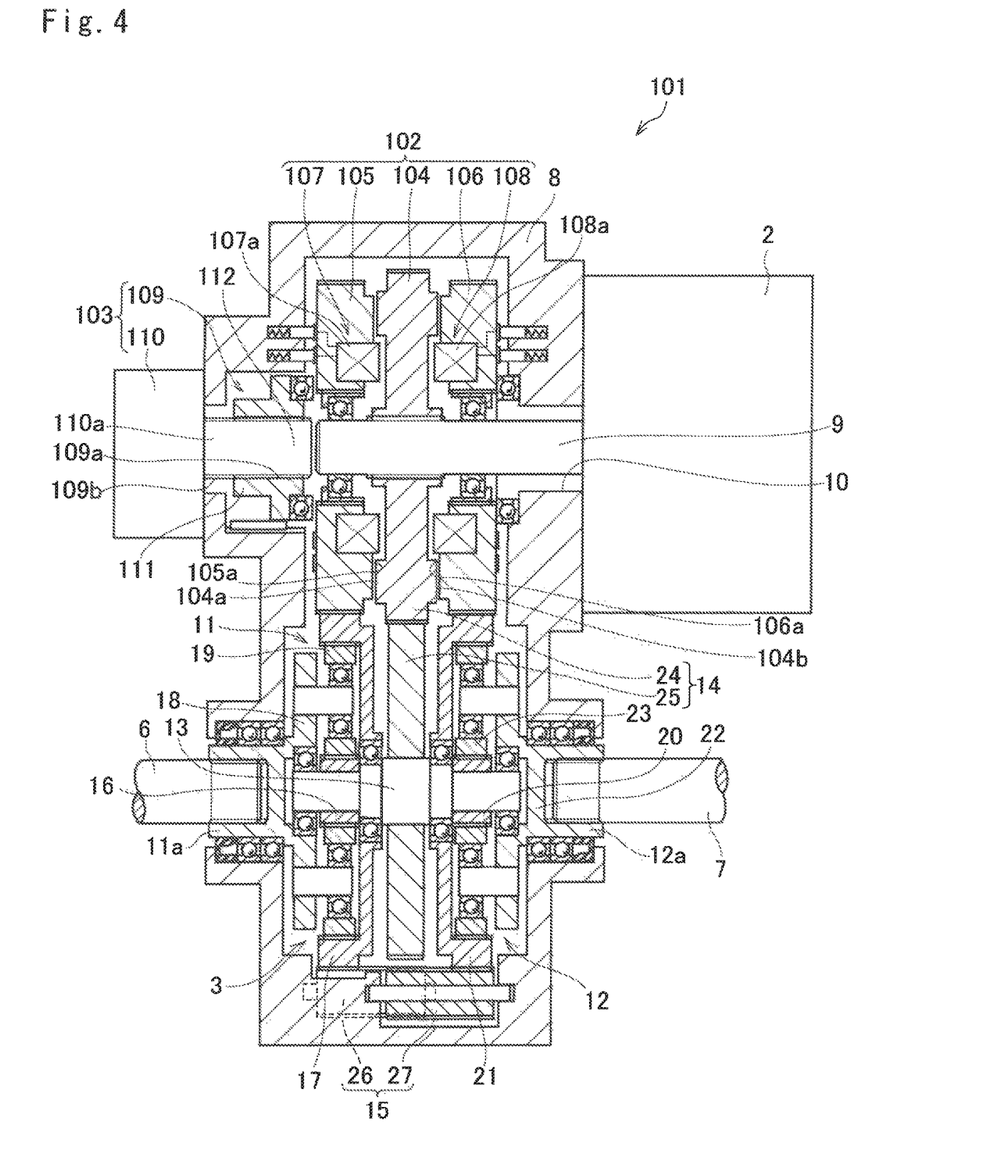
FIG. 4 is a cross-sectional view showing a modification of the motor drive unit.
Figure 5:
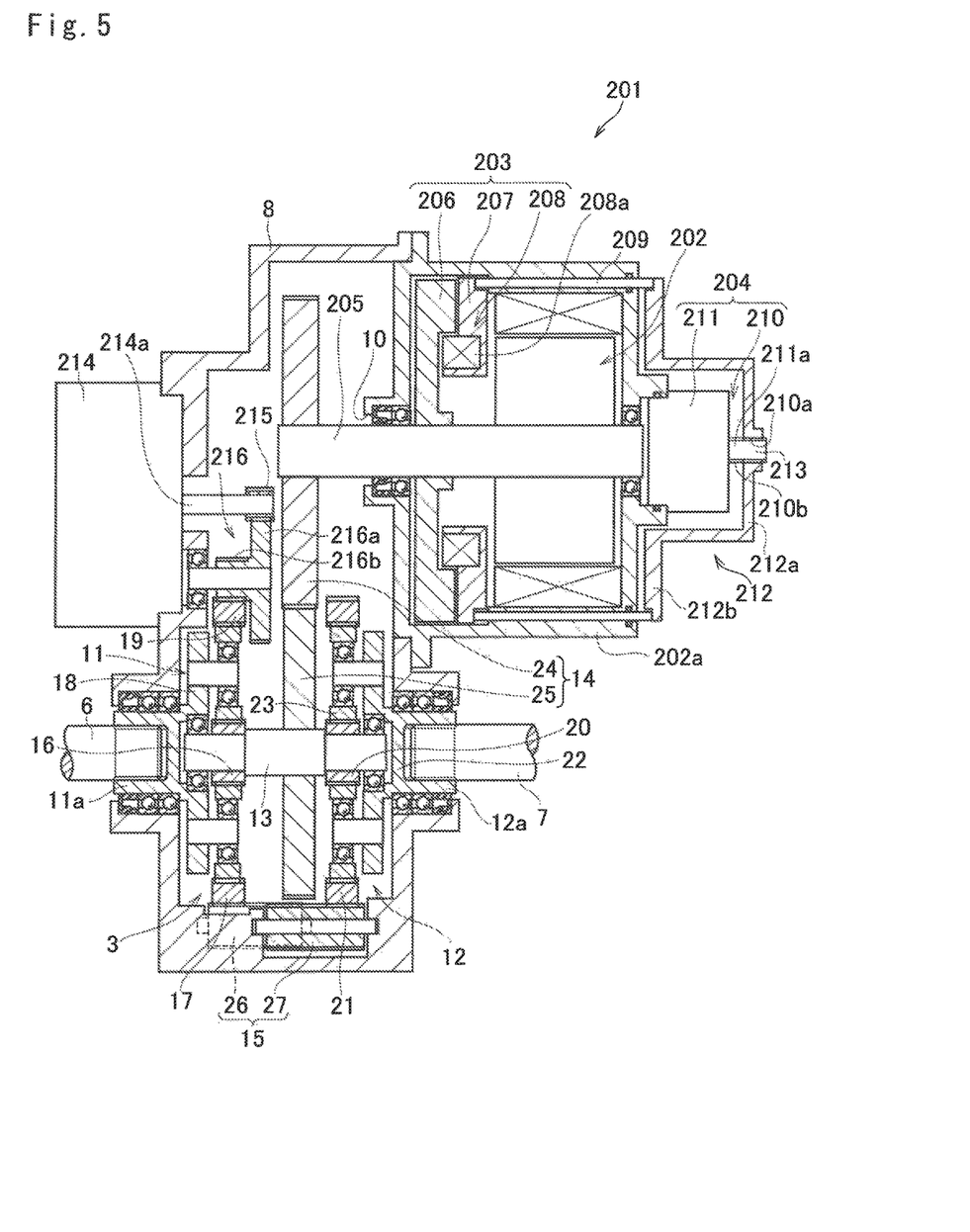
FIG. 5 is a cross-sectional view showing another modification of the motor drive unit in which a differential motor is arranged and the motor drive unit is adapted to serve as a torque vectoring device.
Figure 6:
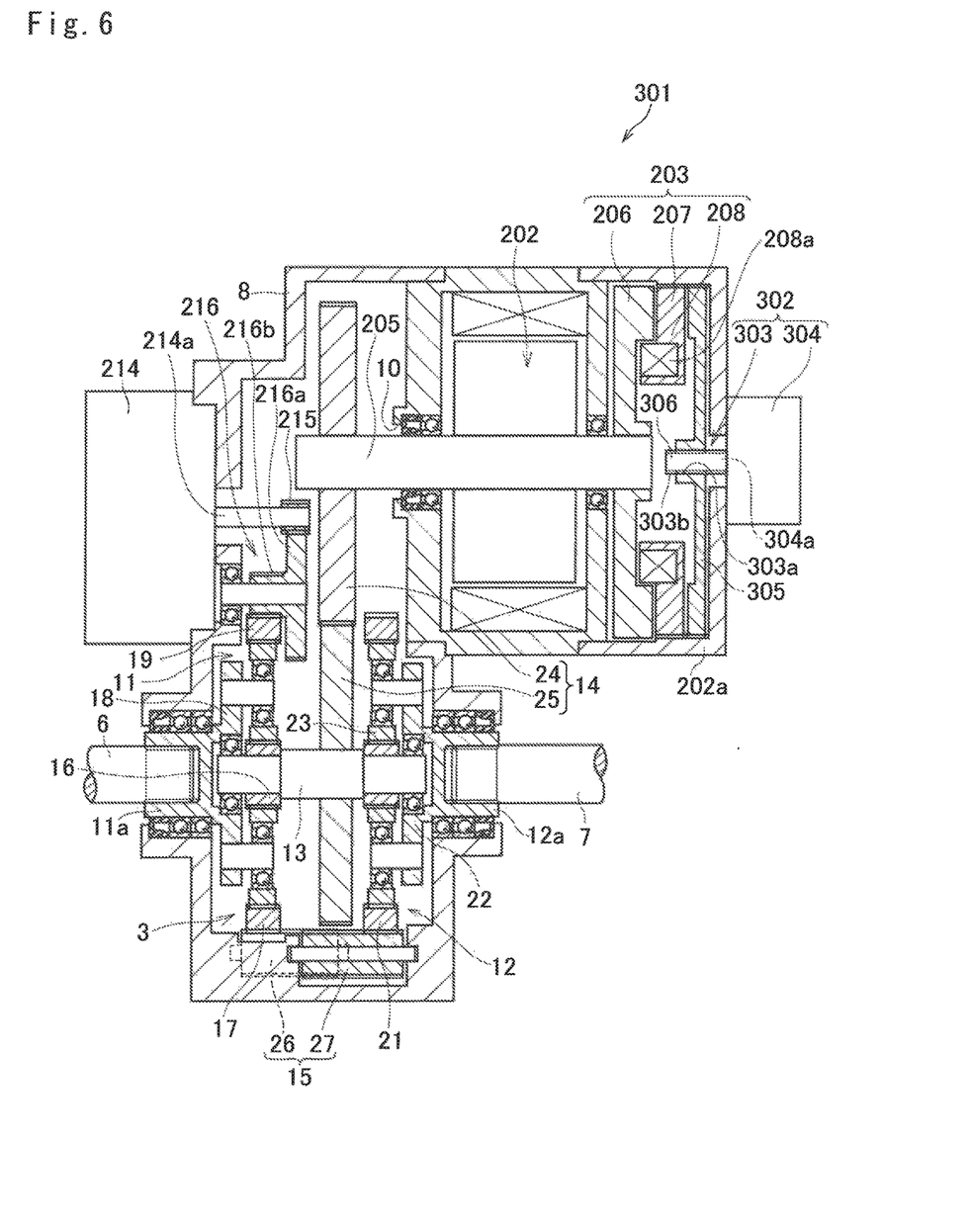
FIG. 6 is a cross-sectional view showing still another modification of the motor drive unit in which a differential motor is arranged and the motor drive unit is adapted to serve as a torque vectoring device.

Modifications of the motor drive unit are shown in FIGS. 4 to 6. As illustrated in FIG. 4, the motor drive unit 101 also comprises the drive motor 2, the differential unit 3, an electromagnetic brake device 102, a parking brake device 103, the first driveshaft 6 and the second driveshaft 7. Structures of the drive motor 2, the differential unit 3, the first driveshaft 6 and the second driveshaft 7 are identical to those of the motor drive unit 1 shown in FIG. 1, and detailed explanations for the common elements will be omitted by allotting common reference numerals thereto.

The motor drive unit 101 further comprises the electromagnetic brake device 102. The electromagnetic brake device 102 comprises a brake rotor 104, a first brake stator 105, a second brake stator 106, a first brake solenoid 107 and a second brake solenoid 108. When the first brake solenoid 107 and the second brake solenoid 108 are energized, the first brake stator 105 and the second brake stator 106 are brought into frictional contact to the brake rotor 104 to generate braking torque for stopping the rotation of a predetermined rotary member. That is, the electromagnetic brake device 102 will not generate braking torque unless the first brake solenoid 107 and the second brake solenoid 108 are energized.

Specifically, the brake rotor 104 is a disc-shaped magnetic member, and the brake rotor 104 is fitted onto the motor shaft 9 to be rotated integrally with the motor shaft 9 while being allowed to reciprocate thereon. Specifically, a spline ridge (or groove) is formed on an outer circumferential face of the output shaft 9 and a spline groove (or ridge) is formed on an inner circumferential face of the brake rotor 104, and the brake rotor 104 is splined onto the motor shaft 9. On an outer circumference of the brake rotor 104, outer teeth (i.e., the drive gear 24) are formed to be meshed with the driven gear 25 of the transmission mechanism 14. Thus, in the motor drive unit 101, a common member serves as the brake rotor 104 of the electromagnetic brake device 102 and as the drive gear 24 of the transmission mechanism 14.

Specifically, in the example shown in FIG. 4, the first brake stator 105 is fitted onto the output shaft 9 on the left side of the brake rotor 104, and the second brake stator 106 is fitted onto the output shaft 9 on the right side of the brake rotor 104. A friction face 104a is formed on one face of the brake rotor 104 to be frictionally contacted to a friction face 105a of the first brake stator 105, and a friction face 104b is formed on the face of the brake rotor 104 to be frictionally contacted to a friction face 106a of the second brake stator 106. In the motor drive unit 101, accordingly, the brake rotor 104 serves as the rotary member of the motor drive unit 101.

The first brake stator 105 is an annular magnetic member, and the first brake stator 105 is fitted onto the output shaft 9 through a bearing while being allowed to reciprocate in the axial direction and to rotate relatively to the brake rotor 104. On an outer circumference of the first brake stator 105, outer teeth are formed to be meshed with the outer teeth of the first ring gear 17 of the differential unit 3. That is, a rotational angle of the first brake stator 105 is restricted by the first ring gear 17. As described, the friction face 105a is formed on one face of the first brake stator 105 to be frictionally contacted to the friction face 104a of the brake rotor 104, and a coil 107a of the first brake solenoid 107 is fixed to an inner circumferential face of the first brake stator 105.

The second brake stator 106 is also an annular magnetic member, and the second brake stator 106 is also fitted onto the output shaft 9 through a bearing while being allowed to reciprocate in the axial direction and to rotate relatively to the brake rotor 104. On an outer circumference of the second brake stator 106, outer teeth are also formed to be meshed with the outer teeth of the second ring gear 21 of the differential unit 3. That is, a rotational angle of the second brake stator 106 is restricted by the second ring gear 21. As described, the friction face 106a is formed on one face of the second brake stator 106 to be frictionally contacted to the friction face 104b of the brake rotor 104, and a coil 108a of the second brake solenoid 108 is fixed to an inner circumferential face of the second brake stator 106. In the motor drive unit 101, accordingly, the second brake stator 106 serves as the brake member of the motor drive unit 101.

The first brake solenoid 107 comprises the brake rotor 104 serving as a fixed magnetic pole, the coil 107a wound around an iron core (not shown), and the first brake stator 105 serving as a movable magnetic pole. The coil 107a is attached to the first brake stator 105 to be moved integrally therewith. When a predetermined current is applied to the coil 107a, the coil 107a establishes magnetic attraction so that the first brake stator 105 is magnetically attracted toward the brake rotor 104.

The second brake solenoid 108 comprises the brake rotor 104 serving as a fixed magnetic pole, the coil 108a wound around an iron core (not shown), and the second brake stator 106 serving as a movable magnetic pole. The coil 108a is attached to the second brake stator 106 to be moved integrally therewith. When a predetermined current is applied to the coil 108a, the coil 108a establishes magnetic attraction so that the second brake stator 106 is magnetically attracted toward the brake rotor 104.

When the first brake stator 105 and the second brake stator 106 are magnetically attracted to the brake rotor 104 by energizing the coils 107a and 108a, the friction face 105a is brought into frictional contact to the friction face 104a, and the friction face 106a is brought into frictional contact to the friction face 104b. Consequently, the first brake stator 105 and the second brake stator 106 are individually engaged with the brake rotor 104 to be rotated integrally therewith. In this situation, the brake rotor 104 is connected to the first sun gear 16 and the second sun gear 20 through the driven gear 25 and the connection shaft 13, and the first brake stator 105 and the second brake stator 106 are individually connected to the first ring gear 17 and the second ring gear 21. In addition, the first ring gear 17 and the second ring gear 21 are connected to each other through the torque reversing mechanism 15. That is, when the first brake stator 105 and the second brake stator 106 are individually engaged with the brake rotor 104, the first sun gear 16 and second 20 are individually connected to the first ring gear 17 and the second ring gear 21. As a result, all of the rotary elements of the first planetary gear unit 11 are connected directly, and all of the rotary elements of the second planetary gear unit 12 are connected directly. In this situation, since the first ring gear 17 and the second ring gear 21 are connected to each other through the torque reversing mechanism 15, torque of the first ring gear 17 and torque of the second ring gear 21 cancel each other to serve as reaction elements. That is, rotational speeds of all of the rotary elements of the first planetary gear unit 11 and the second planetary gear unit 12 are reduced to zero. Consequently, the rotations of the brake rotor 104, the first brake stator 105 and the second brake stator 106 are stopped so that the rotation of the output shaft 9 is stopped. In this situation, differential rotation between the first carrier 18 and the second carrier 22, that is, differential rotation between the first driveshaft 6 and the second driveshaft 7 is restricted.

Thus, in the electromagnetic brake device 102, the first brake stator 105 and the second brake stator 106 are frictionally engaged with the brake rotor 104 by energizing the coils 107a and 108a. Consequently, all of the rotary elements of the first planetary gear unit 11 and the second planetary gear unit 12 are connected directly to stop the rotation of the output shaft 9. In this situation, differential rotation between the first driveshaft 6 and the second driveshaft 7 is restricted.

As described, the motor drive unit 101 is further provided with the parking brake device 103 having a same structure as the parking brake device 5. Specifically, the parking brake device 103 comprises a feed screw mechanism 109 and a brake motor 110 for actuating the feed screw mechanism 109.

Specifically, the feed screw mechanism 109 generates a thrust force to push the first brake stator 105 and the brake rotor 104 in the axial direction toward the second brake stator 106 by translating linear motion to rotational motion thereby bringing the first brake stator 105 and the second brake stator 106 into frictional engagement to the brake rotor 104. In addition, the feed screw mechanism 109 keeps the output shaft 9 stopping even if current supply to the electromagnetic brake device 102 is interrupted. To this end, the feed screw mechanism 109 is provided with a pushing member 111 and a rotary shaft 112.

The female thread is a disc-shaped non-magnetic member, and a female thread hole 109a is formed on a center of the pushing member 111 in such a manner as to penetrate through the pushing member 111 in a thickness direction. A thrust bearing 112 is fitted onto the pushing member 111 to be opposed to the first brake stator 105 so that the pushing member 111 is allowed to rotate relatively to the first brake stator 105 when contacted thereto. That is, a face of the bearing 112 opposed to the first brake stator 105 serves as a pushing face for pushing the first brake stator 105. The pushing member 111 is prevented from rotating by a spline, a key or the like.

The rotary shaft 112 is connected to a motor shaft 110a of the brake motor 110 to be rotated integrally therewith, and the male thread 109b is formed on an outer circumferential face of the rotary shaft 112. The male thread 109b of the rotary shaft 112 is screwed into the female thread hole 109a of the pushing member 111 to form the feed screw mechanism 109.

Specifically, the feed screw mechanism 109 generates a thrust force (or an axial force) for pushing the pushing member 111 in the axial direction toward the first brake stator 105 by rotating the rotary shaft 112 connected to the motor shaft 110a by the brake motor 110 in a predetermined direction (i.e., in the forward direction). By contrast, the pushing member 111 is withdrawn from the first brake stator 105 by rotating the rotary shaft 112 in the opposite direction (i.e., in the reverse direction).

Thus, in the parking brake device 103, the feed screw mechanism 109 generates forward thrust force by generating forward torque by the brake motor 110, and the forward thrust force is applied to the brake stator 29. Consequently, the first brake stator 105 and the second brake stator 106 are frictionally engaged with the brake rotor 104 to halt the output shaft 9. By contrast, the motor shaft 9 is allowed to rotate by generating a reverse torque by the brake motor 110 to withdraw the first brake stator 105 and the brake rotor 104 from the second brake stator 106. That is, the braking force for stopping the rotation of the output shaft 9 is cancelled.

In addition, reversed efficiency of the feed screw mechanism 109 to translate linear motion to rotational motion is adjusted to be lower than forward efficiency to translate rotational motion to linear motion. That is, mechanical efficiency of the feed screw mechanism 109 is tuned in such a manner that the pushing member 111 is moved more efficiently toward the first brake stator 105 by rotating the rotary shaft 112 in the forward direction, and that the rotary shaft 112 is rotated in the reverse direction less efficiently by withdrawing the pushing member 111 from the first brake stator 105. For this reason, the output shaft 9 may be halted by pushing the first brake stator 105 and the brake rotor 104 toward the second brake stator 106 by the feed screw mechanism 109 even if the current supply to the electromagnetic brake device 102 and the brake motor 110 is stopped.

In addition, in the motor drive unit 101, the differential action of the differential unit 3 is restricted by bringing the first brake stator 105 and the second brake stator 106 into frictional engagement with the brake rotor 104. That is, during halting the output shaft 9 by the parking brake device 103, differential rotation between the first driveshaft 6 and the second driveshaft 7 is also restricted. In the motor drive unit 101, therefore, the rotation of the output shaft 9 can be stopped certainly by the parking brake device 103. For example, even if a condition of a road on which the vehicle is parked is uneven, the differential rotation between the first driveshaft 6 and the second driveshaft 7 can be prevented the parking brake device 103 to apply braking force certainly by the vehicle.

A motor drive unit 201 illustrated in FIG. 5 comprises the differential unit 3, the first driveshaft 6, the second driveshaft 7, a drive motor 202, an electromagnetic brake device 203, and a parking brake device 204. In the motor drive unit 201, the electromagnetic brake device 203 is held in a motor case 202a of the drive motor 202, and the drive motor 202 is joined to the casing 8.

A leading end (i.e., a left end in FIG. 5) of an output shaft 205 of the drive motor 202 protrudes from the motor case 202a to be inserted into the casing 8 from an opening 10 of the casing 8, and the drive gear 24 of the transmission mechanism 14 is fitted onto the leading end of the output shaft 205 to be rotated integrally therewith. Accordingly, an output torque of the drive motor 202 is delivered from the output shaft 205 to the differential unit 3.

The electromagnetic brake device 203 comprises a brake rotor 206, a brake stator 207, and a brake solenoid 208. When the brake solenoid 208 is energized, the brake stator 207 is brought into contact to the brake rotor 206 to generate braking torque for stopping the rotation of a predetermined rotary member. That is, the electromagnetic brake device 203 will not generate braking torque unless the brake solenoid 208 is energized.

The brake rotor 206 is a disc-shaped magnetic member, and the brake rotor 206 is fitted onto the output shaft 205 to be rotated integrally therewith, and the brake stator 207 is formed into an annular shape. In the motor drive unit 201, accordingly, the brake rotor 206 serves as the rotary member of the motor drive unit 201.

The brake stator 207 is attached to an inner face of the motor case 202a while being allowed to reciprocate in the axial direction but restricted to rotate. In the motor drive unit 201 shown in FIG. 5, the brake stator 207 is supported by at least two push rods 209 individually as a rod member or a pipe member at an outer circumferential portion of a face opposite to the brake rotor 206. Specifically, each of the push rods 209 is individually inserted into through holes penetrating through the motor case 202a in an axial direction, and one end of each of the push rods 209 is individually attached to the brake stator 207. Thus, in the motor casing 202a, the brake stator 207 is supported by the push rods 209 while being allowed to reciprocate in the axial direction but restricted to rotate around the output shaft 205. Accordingly, the push rods 209 serve as the brake member of the motor drive unit 201.

The brake solenoid 208 comprises the brake rotor 206 serving as a fixed magnetic pole, a coil 208a wound around an iron core (not shown), and the brake stator 207 serving as a movable magnetic pole. The coil 208a is attached to the brake stator 207 to be reciprocated integrally with the brake stator 207 in the axial direction. When a predetermined current is applied to the coil 208a, the coil 208a establishes magnetic attraction so that the first brake stator 207 is magnetically attracted toward the brake rotor 206 to stop the rotation of the output shaft 205.

The motor drive unit 201 is also provided with the parking brake device 5, and the parking brake device 204 having similar structure as the parking brake device 5. Specifically, the parking brake device 204 comprises a feed screw mechanism 210 and a brake motor 211 for actuating the feed screw mechanism 210.

Specifically, the feed screw mechanism 210 generates a thrust force to push the brake stator 207 toward the brake rotor 206 by translating linear motion to rotational motion thereby bringing the brake stator 207 into frictional contact to the brake rotor 206. In addition, the feed screw mechanism 210 keeps the output shaft 205 stopping even if current supply to the electromagnetic brake device 203 is interrupted. To this end, the feed screw mechanism 210 is provided with a pushing member 212 and a rotary shaft 213.

The pushing member 212 includes a cover member 212a covering the brake motor 211 and a flange member 212b expanding radially outwardly from an opening of the cover member 212a. A female thread hole 210a is formed on a center of bottom of the cover member 18a in such a manner as to penetrate therethrough in a thickness direction.

The brake motor 211 is disposed adjacent to the drive motor 202 to be held in the motor case 202a.

The rotary shaft 213 is connected to a motor shaft 211a of the brake motor 211 to be rotated integrally therewith, and a male thread 210b also formed on an outer circumferential face of the rotary shaft 213. The male thread 210b of the rotary shaft 213 is screwed into a female thread hole 32a of the pushing member 212 to form the feed screw mechanism 210.

The motor drive unit 201 is further provided with a differential motor to apply torque to any one of the first ring gear 17 and the second ring gear 21 of the differential unit 3. Specifically, in the example shown in FIG. 5, the motor drive unit 201 is provided with a differential motor 214 to apply torque to the first ring gear 17.

As the drive motors 2 and 202, a permanent magnet synchronous motor, and an induction motor may be used as the differential motor 214. The differential motor 214 is fixed to the casing 8, and a motor shaft 214a of the differential motor 214 is inserted into the casing 8 to be inserted into a pinion 215 that is rotated integrally with the motor shaft 214a.

A reduction gear 216 is arranged in parallel to the motor shaft 214a and the pinion 215. Specifically, the reduction gear 216 includes a diametrically larger gear 216a and a diametrically smaller gear 216b. The diametrically larger gear 216a is meshed with the pinion 215 that is diametrically smaller than the diametrically larger gear 216a, and the diametrically smaller gear 216b is meshed with the outer teeth of the first ring gear 17 that is diametrically larger than the diametrically smaller gear 216b. Accordingly, an output torque of the differential motor 214 is delivered to the first ring gear 17 while being multiplied.

Figure 7:
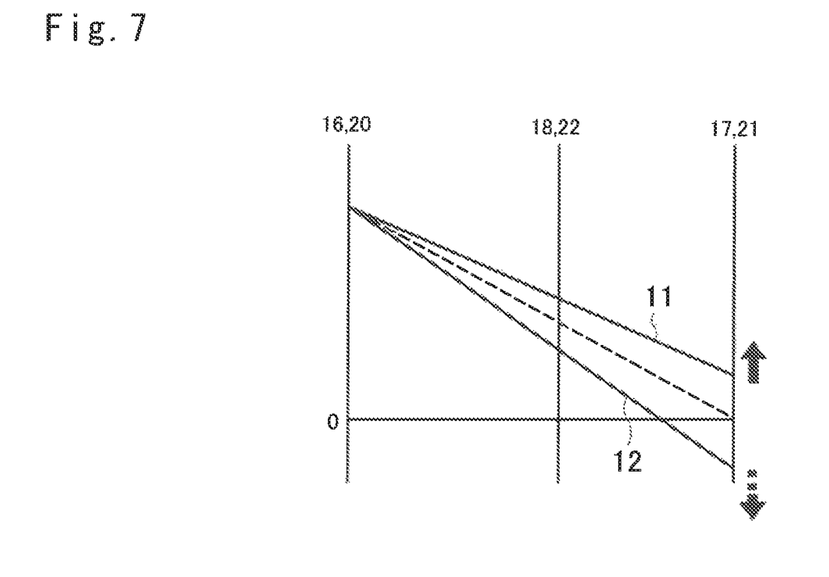
FIG. 7 is a nomographic diagram indicating rotational speeds of rotary elements of the first planetary gear unit and the second planetary gear unit in a case that rotational speeds of the first driveshaft and the second driveshaft are differentiated by the differential motor.

Thus, the motor drive unit 201 is provided with the differential motor 214 to apply torque to the first ring gear 17. As indicated in FIG. 7, when a rotational speed of the first ring gear 17 is raised by the torque of the differential motor 214, the second ring gear 21 is rotated at the same speed as the first ring gear 17 in the opposite direction by the torque reversed by the torque reversing mechanism 15. Consequently, the first carrier 18 and the second carrier 22 are rotated at different speeds in accordance with the rotational speeds of the first ring gear 17 and the second ring gear 21. That is, the rotational speeds of the first carrier 18 and the second carrier 22 and a torque split ratio to the first carrier 18 and the second carrier 22 can be controlled by controlling the output torque and the rotational speed of the differential motor 214. Thus, the motor drive unit 201 may serve as a torque vectoring device.

The parking brake device 204 of the motor drive unit 201 shown in FIG. 5 may be modified as a parking brake device 302 of a motor drive unit 301 shown in FIG. 6. As illustrated in FIG. 6, the parking brake device 302 comprises a feed screw mechanism 303 and a brake motor 304 for actuating the feed screw mechanism 303. Specifically, the feed screw mechanism 303 generates a thrust force to push the brake stator 207 in the axial direction toward the brake rotor 206 by translating linear motion to rotational motion thereby bringing the brake stator 207 into frictional engagement to the brake rotor 206 to stop the rotation of the output shaft 205. Accordingly, the brake rotor 206 serves as the rotary member and the brake stator 207 serves as the brake member of the motor drive unit 301.

The feed screw mechanism 303 includes a pushing plate 305 as a disc member and a rotary shaft 306. The pushing plate 305 is fitted onto the rotary shaft 306 in the motor case 202a while being allowed to reciprocate in the axial direction but restricted to rotate. A female thread hole 303a is formed on a center of the pushing plate 305 in such a manner as to penetrate through the pushing plate 305 in a thickness direction.

The brake motor 304 is disposed adjacent to the pushing plate 305 to be held in the motor case 202a.

The rotary shaft 306 is connected to a motor shaft 304a to be rotated integrally therewith, and a male thread 303b also formed on an outer circumferential face of the rotary shaft 306. The male thread 33b of the rotary shaft 306 is screwed into a female thread hole 330a of the pushing plate 305 to form the feed screw mechanism 303.

Although the above exemplary embodiment of the present application has been described, it will be understood by those skilled in the art that the present application should not be limited to the described exemplary embodiment, and various changes and modifications can be made within the spirit and scope of the present application.

What is claimed is:

1. A motor drive unit, comprising:
   a drive motor;
   a first planetary gear unit having a first sun gear, a first ring gear and a first carrier;
   a second planetary gear unit having a second sun gear, a first second gear and a second carrier;
   a connection shaft connecting the first sun gear and the second sun gear;
   a transmission mechanism that transmits torque between an output shaft of the drive motor and the connection shaft;

a torque reversing mechanism that transmits torque between the first ring gear and the second ring gear while reversing direction of the torque;

a first driveshaft connected to the first carrier and a second driveshaft connected to the second carrier to which output torque of the drive motor is distributed;

an electromagnetic brake device that stops rotation of the output shaft by contacting at least one brake member that is allowed to rotate but a rotational angle thereof is restricted to a rotary member rotated integrally with the output shaft and relatively to the brake member, when energized to establish a magnetic force;

a brake motor that generates torque when energized; and an engagement force generating device that generates an engagement force to bring the brake member into frictional engagement with the rotary member when the output torque of the brake motor is applied thereto, and that maintains the frictional engagement between the brake member and the rotary member to keep stopping the rotation of the output shaft when current supply to the electromagnetic brake device and the brake motor is stopped.

2. The motor drive unit as claimed in claim 1, wherein the engagement force generating device includes a feed screw mechanism that generates an axial force to frictionally engage the brake member with the rotary member by applying the output torque of the drive motor in a predetermined direction.

3. The motor drive unit as claimed in claim 1, wherein the brake member is meshed with outer teeth formed on an outer circumferential face of at least any one of the first ring gear and the second ring gear to be rotated.

4. The motor drive unit as claimed in claim 1, further comprising:
a differential motor that applies torque to any one of the first ring gear and the second ring gear.

5. The motor drive unit as claimed in claim 2, wherein the brake member is meshed with outer teeth formed on an outer circumferential face of at least any one of the first ring gear and the second ring gear to be rotated.

6. The motor drive unit as claimed in claim 2, further comprising:
a differential motor that applies torque to any one of the first ring gear and the second ring gear.

* * * * *